(12) United States Patent
Shen

(10) Patent No.: US 11,891,767 B1
(45) Date of Patent: Feb. 6, 2024

(54) SCUM ABSORBING DEVICE

(71) Applicant: Hongfang Shen, Jiangsu (CN)

(72) Inventor: Hongfang Shen, Jiangsu (CN)

(\*) Notice: Subject to any disclaimer, the term of this patent is extended or adjusted under 35 U.S.C. 154(b) by 0 days.

(21) Appl. No.: 18/098,732

(22) Filed: Jan. 19, 2023

(30) Foreign Application Priority Data

Dec. 20, 2022 (CN) .......................... 202223416787.9

(51) Int. Cl.
*E02B 15/10* (2006.01)
*B01D 39/08* (2006.01)
*E04H 4/16* (2006.01)

(52) U.S. Cl.
CPC .......... *E02B 15/101* (2013.01); *B01D 39/083* (2013.01); *E04H 4/16* (2013.01)

(58) Field of Classification Search
CPC ...... E02B 15/101; E02B 15/04; E02B 15/046; E02B 15/10; B01D 39/083; E04H 4/16; C02F 1/40; C02F 2101/32; E03F 5/14; E03F 5/16; Y02A 20/204
USPC ..................................................... 210/242.4
See application file for complete search history.

(56) References Cited

U.S. PATENT DOCUMENTS

| | | | | |
|---|---|---|---|---|
| 4,395,336 A | * | 7/1983 | Eng | D03D 1/0023 428/92 |
| 5,328,610 A | * | 7/1994 | Rogut | B01J 19/2475 210/321.89 |
| 5,834,385 A | * | 11/1998 | Blaney | B32B 5/022 442/385 |
| 6,517,709 B1 | * | 2/2003 | Cardwell | E03F 1/00 210/170.03 |
| 2012/0020732 A1 | * | 1/2012 | Stiles | E02B 15/06 405/63 |
| 2013/0299402 A1 | * | 11/2013 | Rogahn | E03F 5/0404 210/163 |

FOREIGN PATENT DOCUMENTS

KR 20120044525 A * 5/2012 ............. B01D 39/02

OTHER PUBLICATIONS

Translation of KR20120044525A (Year: 2012).*

\* cited by examiner

*Primary Examiner* — Ekandra S. Miller-Cruz

(57) ABSTRACT

The present disclosure provides a scum absorbing device for absorbing scums in water. The scum absorbing device includes a front absorbing body, the front absorbing body includes: a first front layer defining a plurality of first via holes; a second front layer; and a third front layer, connected between the first front layer and the second front layer, the third front layer is capable of absorbing or capturing scums in water.

19 Claims, 24 Drawing Sheets

100k

SCUM ABSORBING DEVICE

CROSS REFERENCE TO RELATED APPLICATIONS

The present application claims the benefit of Chinese Patent Application No. 202223416787.9 filed on Dec. 20, 2022, the contents of which are incorporated herein by reference in their entirety.

FIELD

The present disclosure relates to a scum absorbing device.

BACKGROUND

People often put a scum absorbing device in bathtub or swimming pool to absorb scums in water. The existing scum absorbing devices are completely made of sponge, which are not environmentally friendly, and are prone to age and fragment after a long time of use.

SUMMARY

The present disclosure aims to provide a scum absorbing device for absorbing scums in water. The scum absorbing device includes a front absorbing body, the front absorbing body includes: a first front layer defining a plurality of first via holes; a second front layer; and a third front layer, connected between the first front layer and the second front layer, the third front layer is capable of absorbing or capturing scums in water.

The present disclosure further provides another scum absorbing device for absorbing scums. The scum absorbing device includes a front absorbing body which includes a first front layer, a second front layer, and a third front layer extending between the first front layer and the second front layer.

BRIEF DESCRIPTION OF THE DRAWINGS

Implementations of the present disclosure will now be described, by way of embodiment, with reference to the attached FIG.s. It should be understood, the drawings are shown for illustrative purpose only, for ordinary person skilled in the art, other drawings obtained from these drawings without paying creative labor by an ordinary person skilled in the art should be within scope of the present disclosure.

Figure 1:
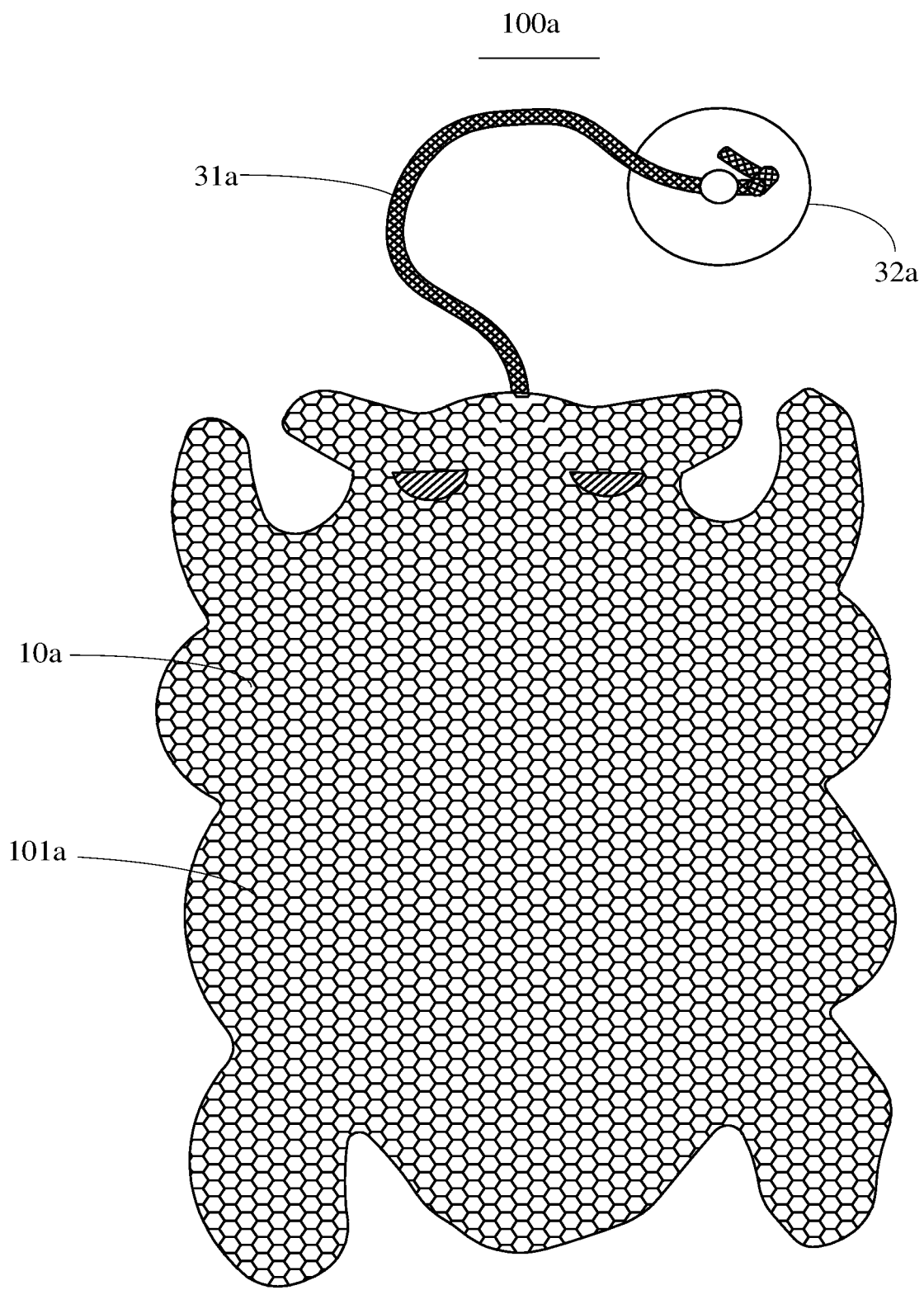
FIG. 1 is a structure diagram of a scum absorbing device according to a first embodiment of the present disclosure.
Figure 2:
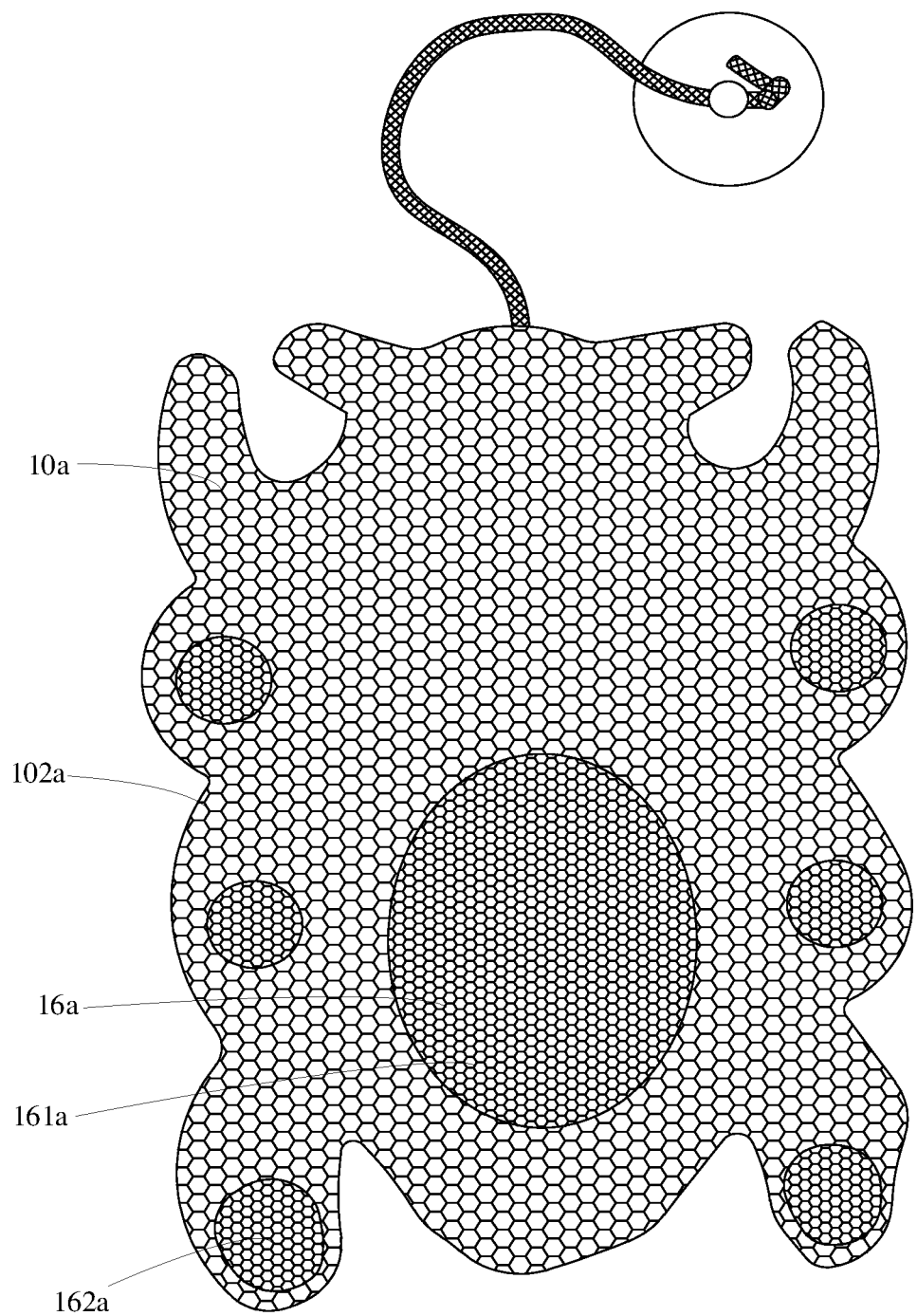
FIG. 2 is another structure diagram of the scum absorbing device of FIG. 1.
Figure 3:
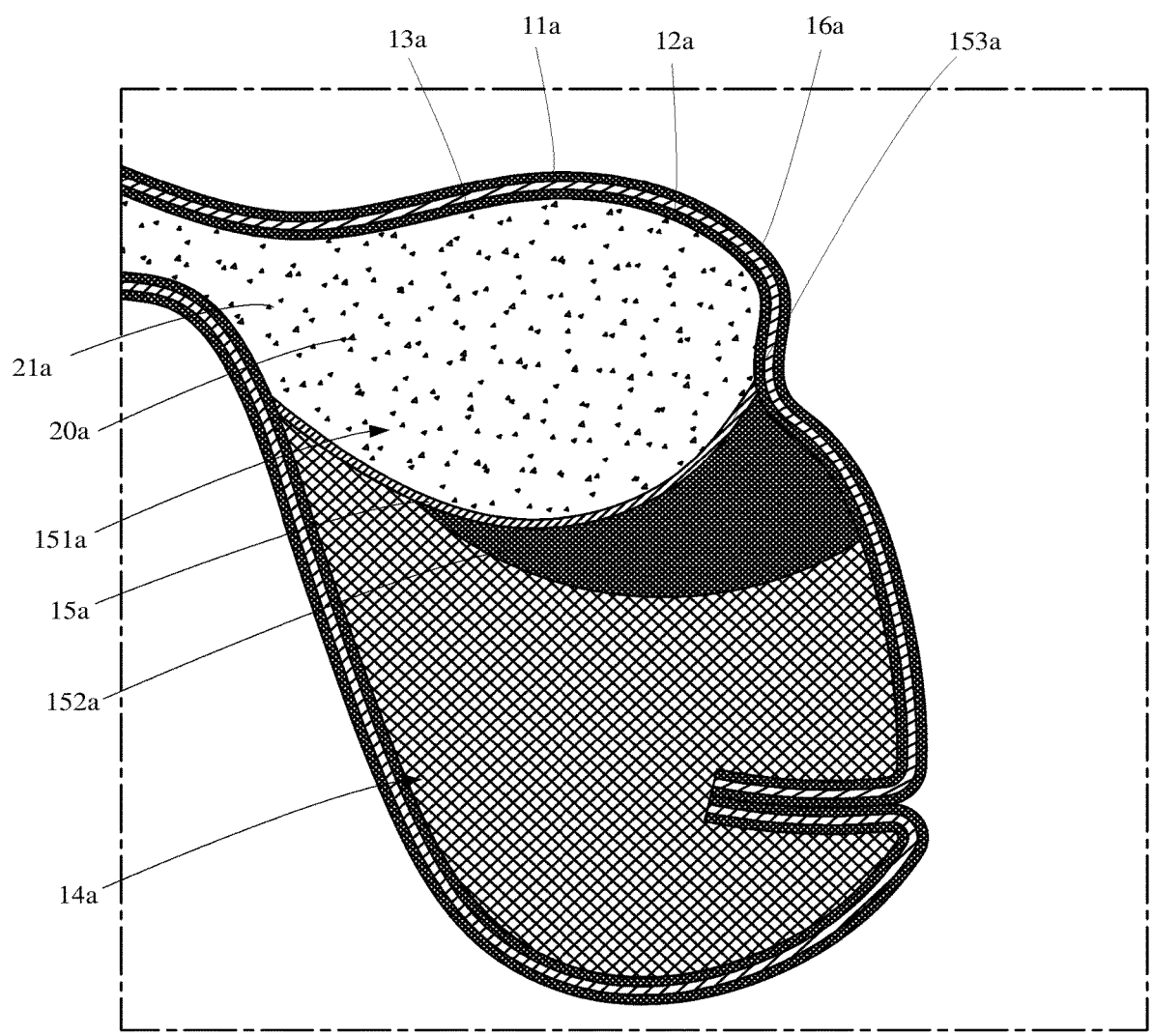
FIG. 3 is a cross sectional diagram of the scum absorbing device of FIG. 1.
Figure 4A:
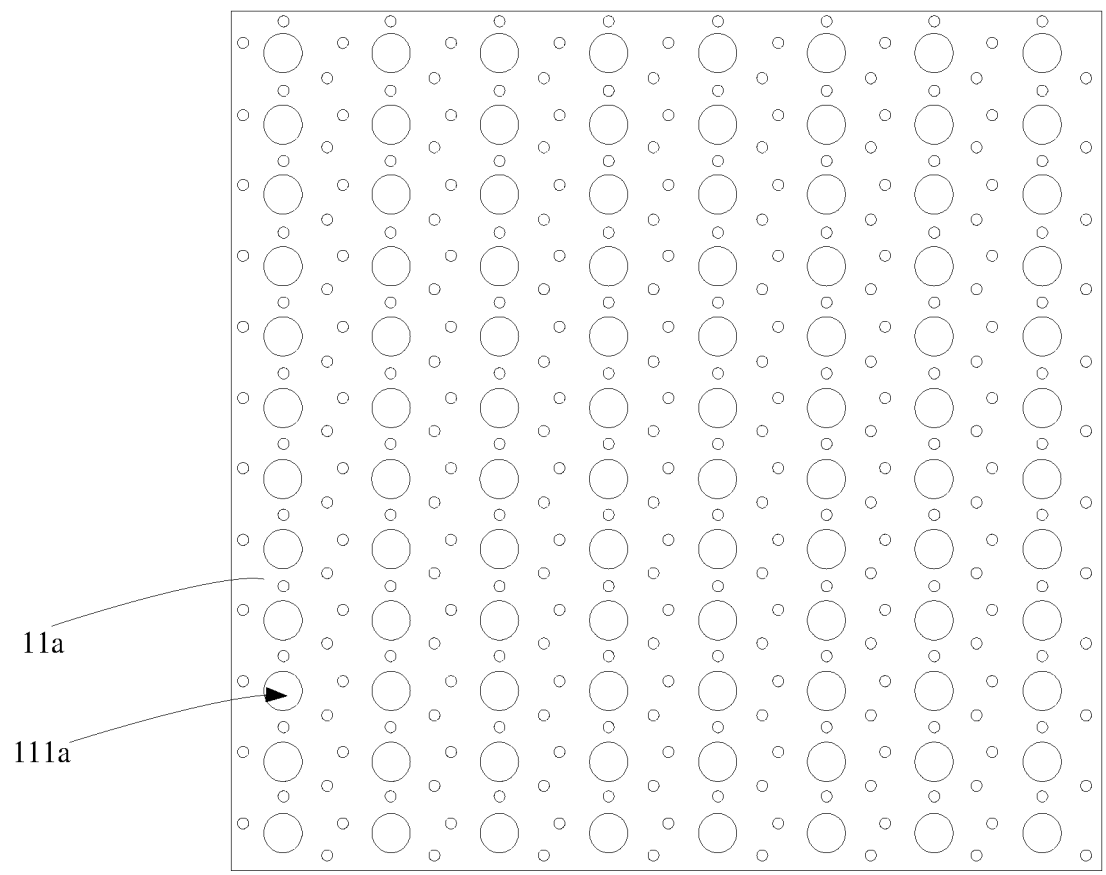
FIG. 4A is a front side diagram of a part of an absorbing body in FIG. 1.
Figure 4B:
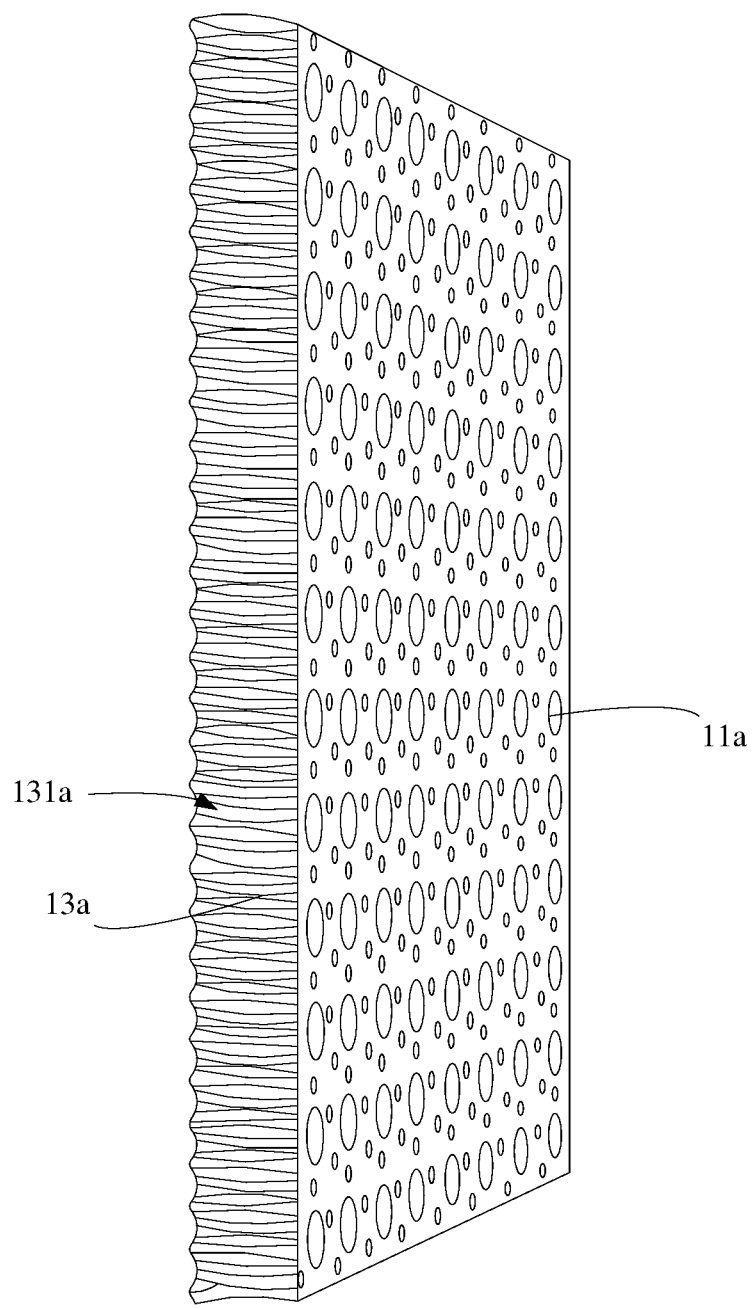
FIG. 4B is a right side diagram of a part of the absorbing body in FIG. 1.
Figure 4C:
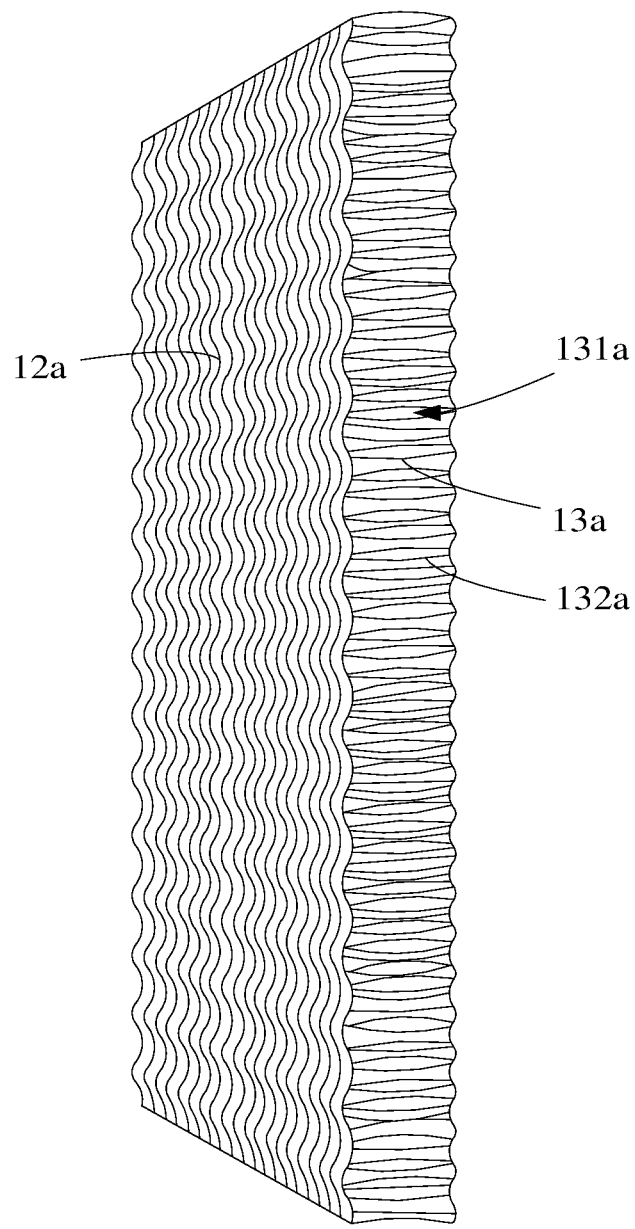
FIG. 4C is a left side diagram of a part of the absorbing body in FIG. 1.
Figure 5:
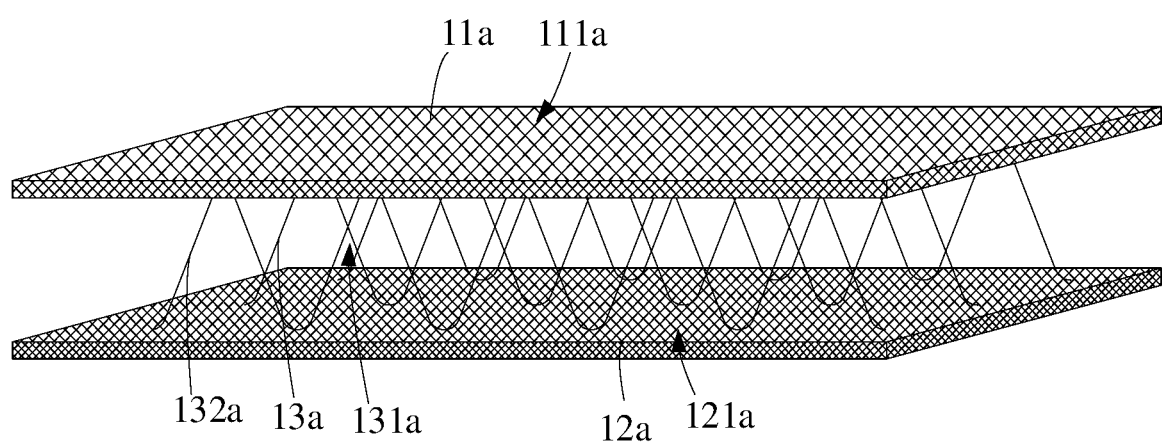
FIG. 5 is another structure diagram of an absorbing body in FIG. 1.

The realization of the aim, functional characteristics, advantages of the present disclosure are further described specifically with reference to the accompanying drawings and embodiments.

DETAILED DESCRIPTION

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present invention without creative efforts shall fall within the protection scope of the present invention.

It is to be understood that, all of the directional instructions in the exemplary embodiments of the present disclosure (such as top, down, left, right, front, back . . . ) can only be used for explaining relative position relations, moving condition of the elements under a special form (referring to figures), and so on, if the special form changes, the directional instructions change accordingly.

In addition, the descriptions, such as the "first", the "second" in the present disclosure, can only be used for describing the aim of description, and cannot be understood as indicating or suggesting relative importance or impliedly indicating the number of the indicated technical character. Therefore, the character indicated by the "first", the "second" can express or impliedly include at least one character. In addition, the technical proposal of each exemplary embodiment can be combined with each other, however the technical proposal must base on that the ordinary skill in that art can realize the technical proposal, when the combination of the technical proposals occurs contradiction or cannot realize, it should consider that the combination of the technical proposals does not exist, and is not contained in the protection scope required by the present disclosure.

Referring to FIGS. 1-5, the present disclosure provides a scum absorbing device 100a according to a first embodiment. The scum absorbing device 100a can float on the surface of the water for absorbing scums, such as oils, debris, foams, cosmetics, exfoliated skin, etc. The scum absorbing device 100a includes an absorbing body 10a which include a front absorbing body 101a and a rear absorbing body 102a, the rear absorbing body 102a is connected with the front absorbing body 101a, by stitching, cleats, rivets, buttons, snaps, or other methods of mechanical connection know in the art. In one embodiment, the rear absorbing body 102a is connected with the front absorbing body 101a on a periphery of the rear absorbing body 102a or the front absorbing body 101a by sewing or needling. In other embodiments, the rear absorbing body 102a is connected with the front absorbing body 101a on other positions, but not limited on the periphery. The rear absorbing body 102a and the front absorbing body 101a can be formed from a single piece of material that is folded approximately in half where a first half can be the rear absorbing body 102a, and a second half can be the front absorbing body 101a. Although the rear absorbing body 102a and the front absorbing body 101a are referred as separate absorbing body, those of skill in the art will appreciate that the rear absorbing body 102a and the front absorbing body 101a can be formed from a single piece of material.

The front absorbing body 101a includes a first front layer 11a defining a plurality of first via holes 111a, a second front layer 12a defining a plurality of second via holes 121a, and a third front layer 13a connected between the first front layer 11a and the second front layer 12a. In another embodiment, the first via holes 111a and the second via holes 121a of the second front layer 12a are not visible to naked eyes. The first via holes 111a and the second via holes 121a allow the water to substantially move effectively therethrough. The third front layer 13a defines a plurality of gaps 131a communicated with the first via holes 111a and the second via holes 121a, the third front layer 13a is capable of absorbing scums in water and capturing the scums in the gaps 131a, namely a first adsorption. The scum absorbing device 100a can be cleaned and reused without being aging and fragmenting, and the scum absorbing device 100a will not fragment to contaminate the water.

The rear absorbing body 102a has a same structure as the front absorbing body 101a. In detail, the rear absorbing body 102a includes a first rear layer (not labeled) defining a plurality of first via holes, a second rear layer (not labeled) defining a plurality of second via holes, and a third rear layer (not labeled) connected between the first rear layer and the second rear layer. In another embodiment, the second via holes 121a of the second rear layer 12a not visible to naked eyes. The third rear layer defines a plurality of gaps (not labeled) communicated with the first via holes and the second via holes, the third rear layer is capable of absorbing scums in water and capturing the scums in the gaps. The rear absorbing body is connected with the front absorbing body, and the first front layer and the first rear layer are the outermost layers.

The first front layer 11a, the second front layer 12a or the third later 13a may be woven into a mesh structure. In one embodiment, the first front layer 11a, the second front layer 12a and the third front layer 13a may be woven together, and integratedly formed as a whole. In another embodiment, the first front layer 11a, the second front layer 12a and the third front layer 13a are formed independently, and then coupled together.

The front absorbing body 101a and the rear absorbing body 102a may be designed with patterns such as eyes, nose, mouth, hands, etc., and the rear absorbing body 102a may be designed with patterns such as tail, arse, foot, etc. The absorbing body 10a may be animal shaped, plant shaped, sun shaped, fried egg shaped, ring shaped, cloud shaped, or smiley face shaped, and the absorbing body 10a may be shaped according to the actual needs. The first embodiment of the present disclosure designs the absorbing body 10a into a shape of an insect.

The first via hole 111a or the second via hole 121a is triangular shaped, quadrangular shaped, pentagonal shaped, hexagonal shaped, oval shaped, trapezoidal shaped, circular shaped, or irregular shaped. The first via hole 11a and the second via hole 121a may be designed to have suitable shape according to actual needs.

The first front layer 11a has a thickness of about 0.01 mm-100 mm. The second front layer 12a has a thickness of about 0.01 mm-100 mm. The third front layer 13a has a thickness of about 0.1-100 mm. For example, the first front layer 11a has a thickness of about 0.01 mm, 1 mm, 10 mm, 20 mm, 30 mm, 40 mm, 50 mm, 60 mm, 70 mm, 80 mm, 90 mm, or 100 mm; the second front layer 12a has a thickness of about 0.01 mm, 1 mm, 10 mm, 20 mm, 30 mm, 40 mm, 50 mm, 60 mm, 70 mm, 80 mm, 90 mm, or 100 mm; the third front layer 13a has a thickness of about 0.1 mm, 1 mm, 5 mm, 10 mm, 20 mm, 30 mm, 40 mm, 50 mm, 60 mm, 70 mm, 80 mm, 90 mm, or 100 mm.

The first via hole 111a has a diameter of about 0.01-10 mm. For example, the first via hole 111a has a diameter of 0.01 mm, 0.1 mm, 1 mm, 2 mm, 3 mm, 4 mm, 5 mm, 6 mm, 7 mm, 8 mm, 9 mm, or 10 mm. The second via hole 121a has a diameter of about 0.01-10 mm. For example, the second via hole 121a has a diameter of 0.01 mm, 0.1 mm, 1 mm, 2 mm, 3 mm, 4 mm, 5 mm, 6 mm, 7 mm, 8 mm, 9 mm, or 10 mm. The first via hole 111a is larger than the second via hole 121a, and the second front layer 12a may be tightly woven to support the first front layer 11a and the third front layer 13a, avoid a deformation of the absorbing body 10a.

The third front layer 13a includes a plurality of pile members 132a connected between the first front layer 11a and the second front layer 12a, the pile members 132a are spaced apart from each other to defines the gaps 131a. Each pile member 132a extends between the first front layer 11a and the second front layer 12a. The pile members 132a are substantially perpendicular to the first front layer 11a or the second front layer 12a (see FIGS. 4B-4C), and the pile members 132a are substantially C-shaped. In another embodiment, the pile members 132a are substantially obliquely connected between the first front layer 11a and the second front layer 12a (see FIG. 5), an angle defined between the first front layer 11a and the pile member 132a may be about 1-90°, and the pile members 132a cross with each other. For example, the angle is 1°, 5°, 10°, 20°, 30°, 40°, 50°, 60°, 70°, 80°, or 90°. The first front layer 11a, the second front layer 12a, and the third front layer 13a cooperatively form a sandwiched structure, the water pass through the first via holes 111a, the gaps 131a, and the second via holes 121a in sequence, and the scums in the water may be adsorbed by the pile members 132a and captured in the gaps 131a, so as to remove the scums in the water. A center of the first via hole 111a is at least partially staggered from that of the gap 131a or the second via hole 121a, to improve the scum absorption effect. The pile members 132a are elastic, so the absorbing body 10a is also flexible to provide a good user experience and a long service life.

The gap 131a has a diameter of about 0.01-100 mm. The gap 131a has a length of about 0.01-100 mm. For example, the gap 131a has a diameter of 0.01 mm, 0.1 mm, 1 mm, 5 mm, 10 mm, 20 mm, 30 mm, 40 mm, 50 mm, 60 mm, 70 mm, 80 mm, 90 mm, or 100 mm; the gap 131a has a length of 0.01 mm, 0.1 mm, 1 mm, 5 mm, 10 mm, 20 mm, 30 mm, 40 mm, 50 mm, 60 mm, 70 mm, 80 mm, 90 mm, or 100 mm.

The pile members 132a are made of cotton, fiber, or the like. The cotton is fiber cotton, acrylic cotton, pearl wool, or the like. The fiber is polyester fiber, nylon fiber, polyurethane fiber, propylene fiber, vinyl fiber, viscose fiber, polyamide fiber, modal, lyocell, linen, rayon, or the like.

The fiber may be spherical fiber, filament fiber, or fiber clumps. The first front layer 11a and the second front layer 12a may be made of the same material as the pile member 132a, or may be made of a material different from the pile member 132a.

The front absorbing body 101a and the rear absorbing body 102a cooperatively defines a receiving space 14a communicated with the second via holes 121a. The scum absorbing device 100a further includes a middle absorbing member 20a received in the receiving space 14a, the middle absorbing member 20a is configured to absorb scums passing through the second via holes 121a, namely a secondary adsorption. The middle absorbing member 20a is made of cotton (including fiber cotton, acrylic cotton, pearl wool, and the like), fiber (including polyester fiber, nylon fiber, polypropylene fiber, propylene fiber, vinyl fiber, viscose fiber, polyamide fiber, modal, lyocell, linen, rayon, and the like), glass fiber filter cotton, flax, activated carbon, or ion exchange resin, and the fiber may be spherical fiber, filament fiber, or fiber clumps. Further, the middle absorbing member 20a includes one or more of: styrene-butadiene copolymers, styrene-isoprene copolymers, styrene-butadiene-styrene block copolymers, styrene-isoprene-styrene block copolymers, styrene-butadiene-styrene/ethylene-propylene diene block copolymers, or styrene-ethylene-propylene-styrene block copolymers. The scum absorbing device 100a further includes at least one receiving member 15a received in the receiving space 14a, the receiving member 15a may be made of gauze, the receiving member 15a is connected with an inner side of the second front layer 12a of the rear absorbing body 102a to define a receiving portion 151a for receiving the middle absorbing member 20a. The receiving member 15a defines a plurality of third via holes 152a communicated with the receiving space 14a. The third via hole 152a has a diameter of about 0.01-5 mm. For example, the third via hole 152a has a diameter of 0.01 mm, 0.1 mm, 1 mm, 2 mm, 3 mm, 4 mm, or 5 mm. which allows the water to substantially move effectively therethrough. The absorbing body 10a further includes at least one protruding portion 16a connected with the receiving member 15a to cooperatively define the receiving portion 151a. The at least one protruding portion 16a includes a first protruding portion 161a protruded from the rear absorbing body 102a and a plurality of second protruding portion 162a protruded from the rear absorbing body 102a. The first protruding portion 161a is connected with a first receiving member 153a to form a first receiving portion (not labeled) for receiving a first middle absorbing member 21a. The second protruding portion 162a are connected the second receiving member (not labeled) to form second receiving portion (not labeled) for receiving second middle absorbing members. The first protruding portion 161a is arranged at a middle portion of the rear absorbing body 102a. The second protruding portion 162a are arranged around arranged along an edge of the rear absorbing body 102a. The second middle absorbing members 162a are arranged around the first middle absorbing member 161a. The first middle absorbing member 161a is larger than the second middle absorbing member 162a in size. The first protruding portion 161a and the second protruding portion 162a are used to absorb oily scums or liquid scums, such as foams, oils, cosmetics, etc.

The at least one middle absorbing member 20a includes the first middle absorbing member 21a matched with the first protruding portion 161a and the second middle absorbing members (not labeled) spaced apart from each other and matched with the second middle absorbing members 162a. The first middle absorbing member 21a is arranged at a middle portion of the rear absorbing body 102a. The second middle absorbing members are arranged around arranged along an edge of the rear absorbing body 102a. The second middle absorbing members are arranged around the first middle absorbing member 21a. The first middle absorbing member 21a is larger than the second middle absorbing member in size.

The scum absorbing device 100a further includes a connecting member 31a connected with the absorbing body 10a, and a fixing member 32a connected with the connecting member 31a. The fixing member 32a is configured to fix the absorbing body 10a on an object, such as the bathtub, and the swimming pool, etc. The fixing member 32a may be a suction cup, a hook, etc.

Figure 6:
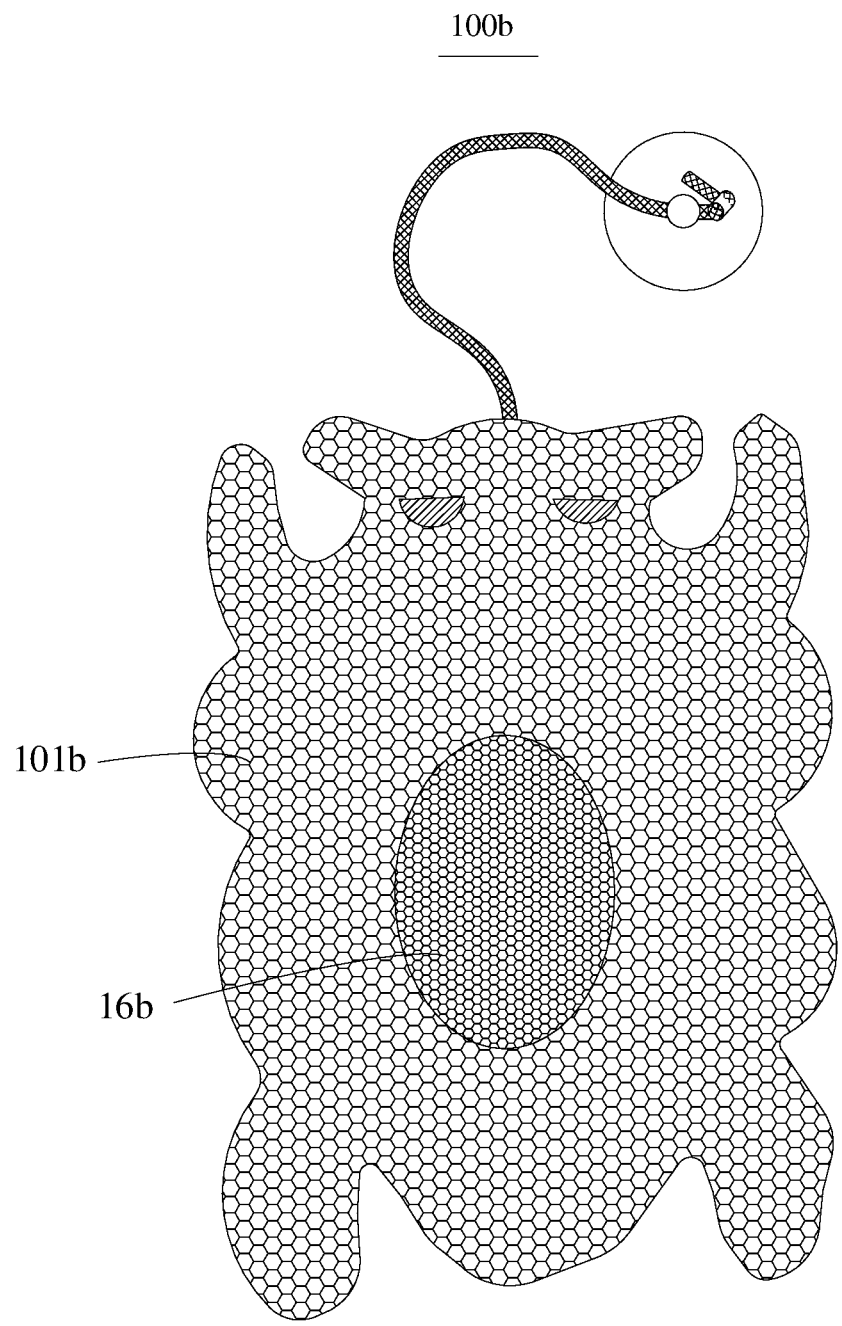
FIG. 6 is a structure diagram of a scum absorbing device according to a second embodiment of the present disclosure.
Figure 7:
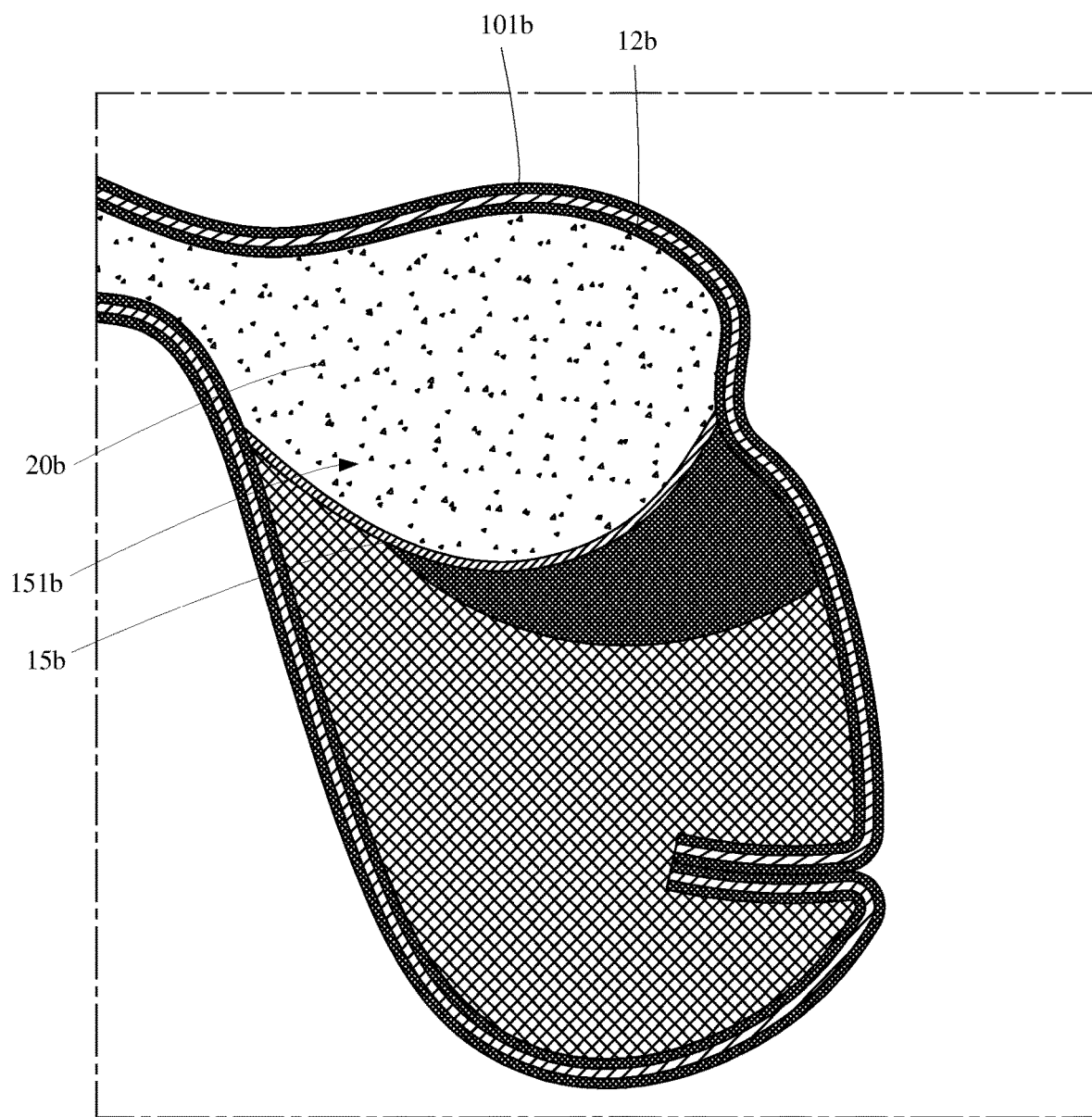
FIG. 7 is a cross sectional diagram of the scum absorbing device of FIG. 6.

Referring to FIGS. 6-7, the present disclosure provides a scum absorbing device 100b according to a second embodiment, the scum absorbing device 100b is similar to the scum absorbing device 100a in structure, the difference between the two at least includes: the protruding portion 16b protrudes from the front absorbing body 101b, and the receiving member 15b is connected with the second front layer 12b of the front absorbing body 101b to define the receiving portion 151b.

Figure 8:
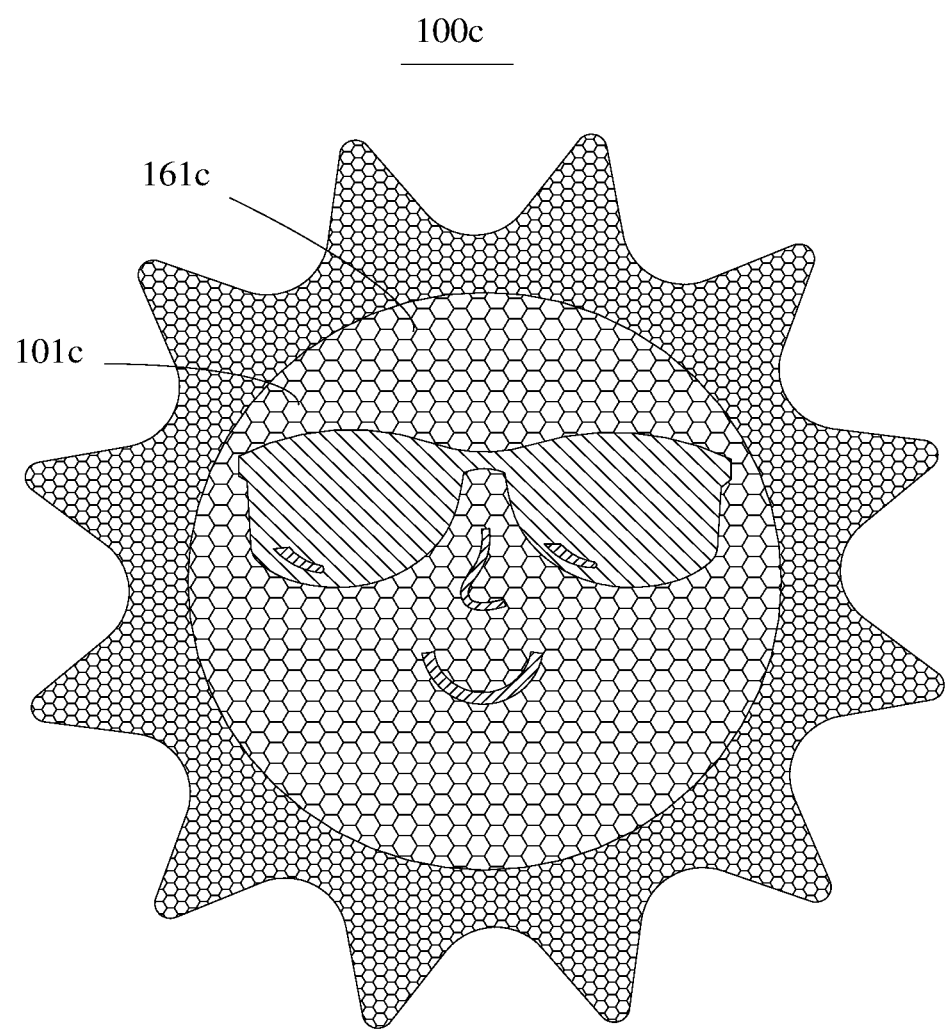
FIG. 8 is a structure diagram of a scum absorbing device according to a third embodiment of the present disclosure.
Figure 9:
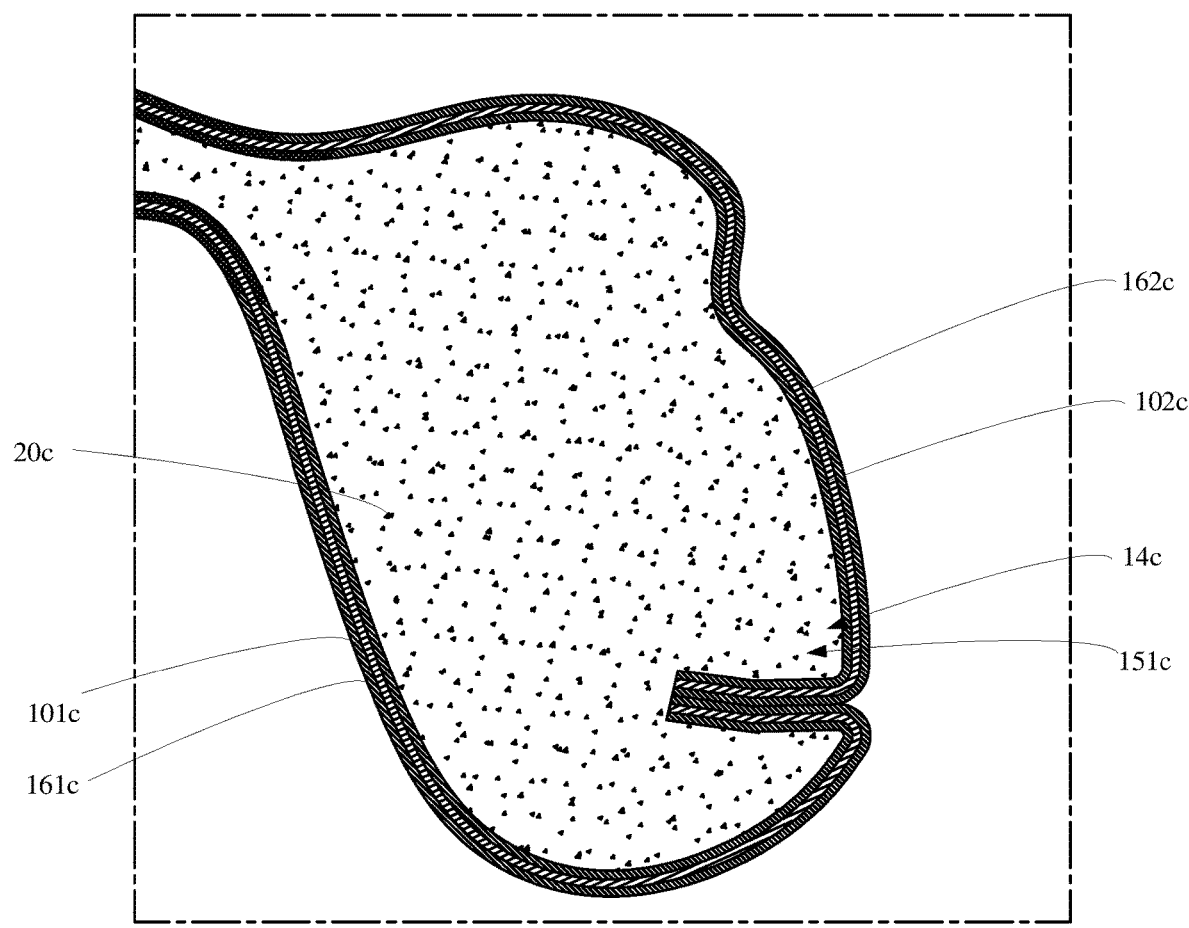
FIG. 9 is a cross sectional diagram of the scum absorbing device of FIG. 8.

Referring to FIGS. 8-9, the present disclosure provides a scum absorbing device 100c according to a third embodiment, the scum absorbing device 100c is similar to the scum absorbing device 100a in structure, the differences between the two at least includes: a protruding portion 161c is protruded from the front absorbing body 101c, a protruding portion 162c is protruded from the rear absorbing body 102c, the protruding portion 161c and the protruding portion 162c cooperatively define the receiving portion 151c for receiving the middle absorbing member 20c; the receiving space 14c overlaps with the receiving portion 151c; the front absorbing body 101c is printed with glasses, nose and mouth.

Figure 10:
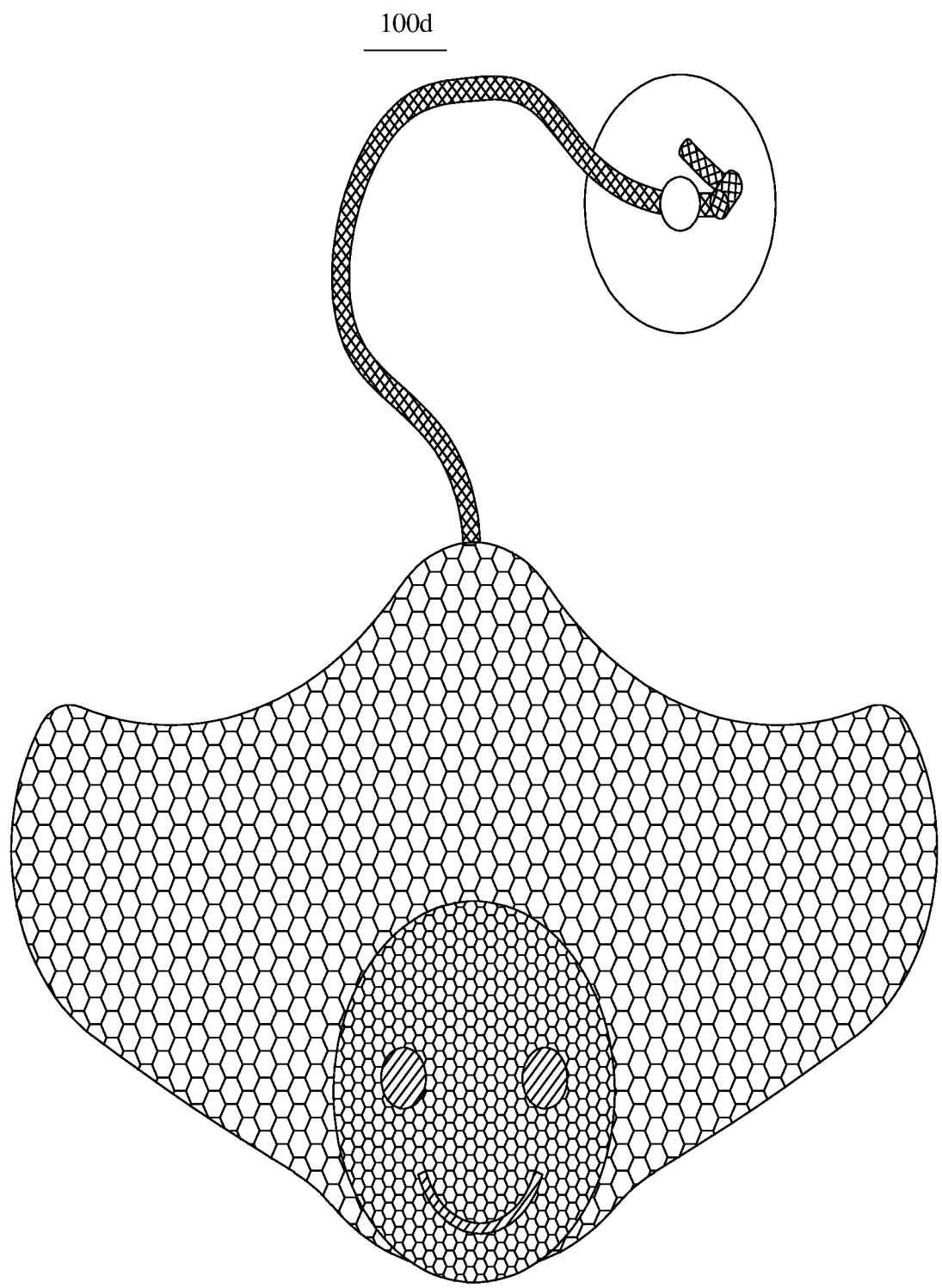
FIG. 10 is a structure diagram of a scum absorbing device according to a fourth embodiment of the present disclosure.

Referring to FIG. 10, the present disclosure provides a scum absorbing device 100d according to a fourth embodiment, the scum absorbing device 100d is similar to the scum absorbing device 100b in structure, the difference between the two at least includes: the scum absorbing device 100d is cloud shaped; and the protruding portion 161d protrudes from a head portion of the scum absorbing device 100d.

Figure 11:
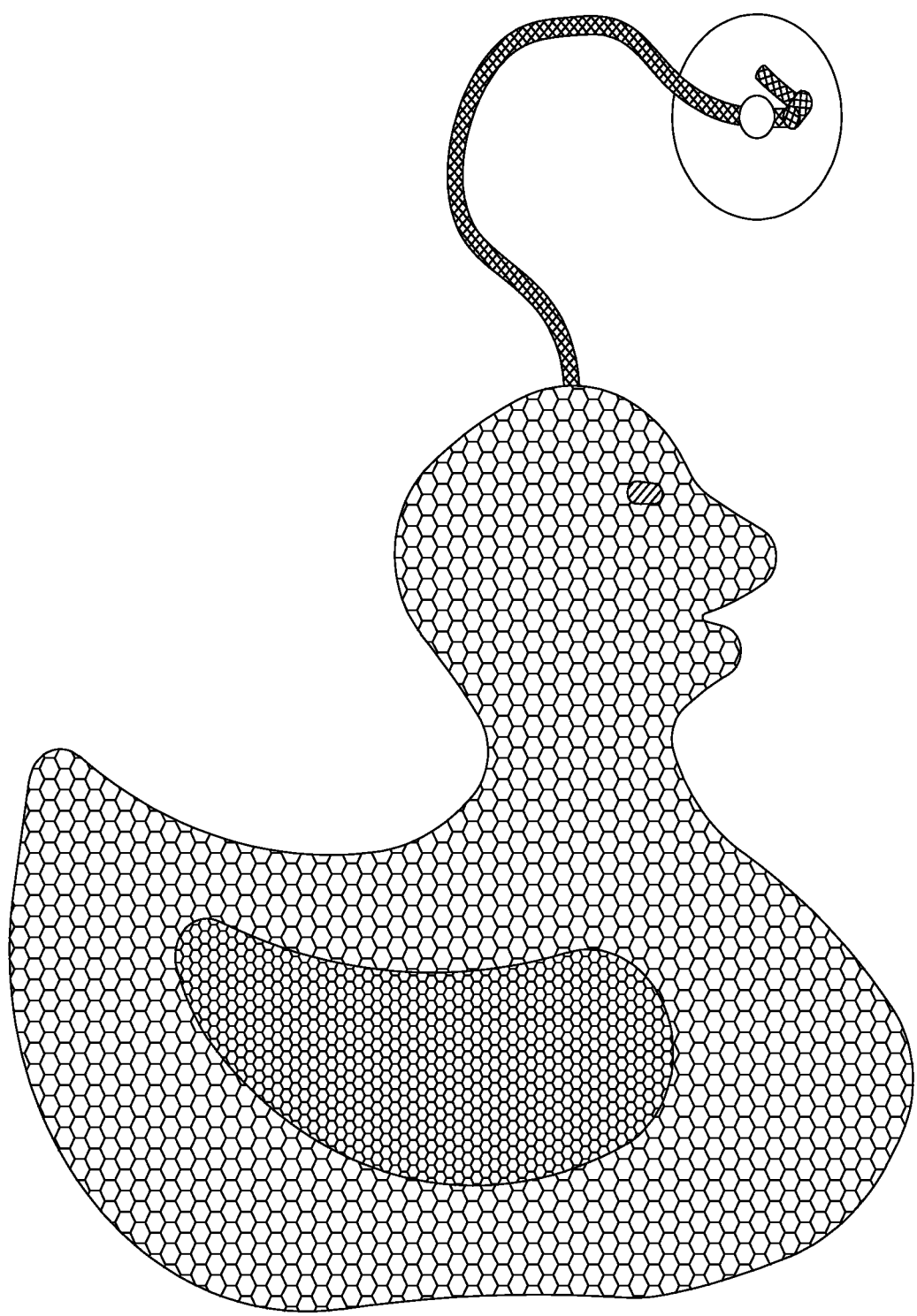
FIG. 11 is a structure diagram of a scum absorbing device according to a fifth embodiment of the present disclosure.

Referring to FIG. 11, the present disclosure provides a scum absorbing device 100e according to a fifth embodiment, the scum absorbing device 100e is similar to the scum absorbing device 100b in structure, the difference between the two at least includes: the scum absorbing device 100e is duck shaped.

Figure 12:
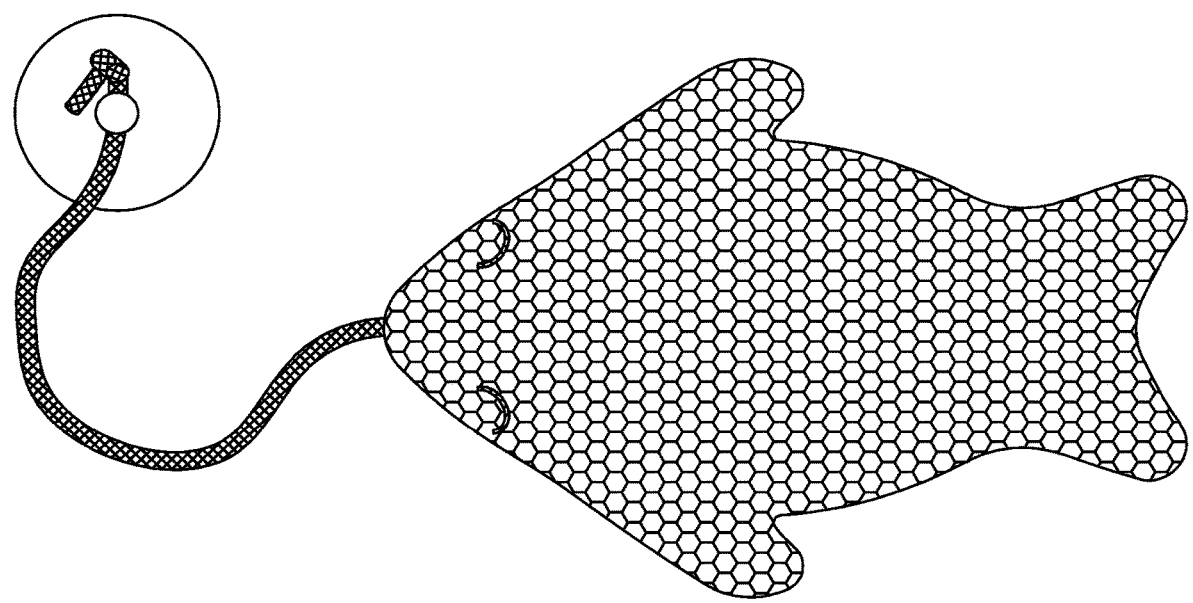
FIG. 12 is a structure diagram of a scum absorbing device according to a sixth embodiment of the present disclosure.

Referring to FIG. 12, the present disclosure provides a scum absorbing device 100f according to a sixth embodiment, the scum absorbing device 100f is similar to the scum absorbing device 100a in structure, the difference between the two at least includes: the scum absorbing device 100f is fish shaped.

Figure 13:
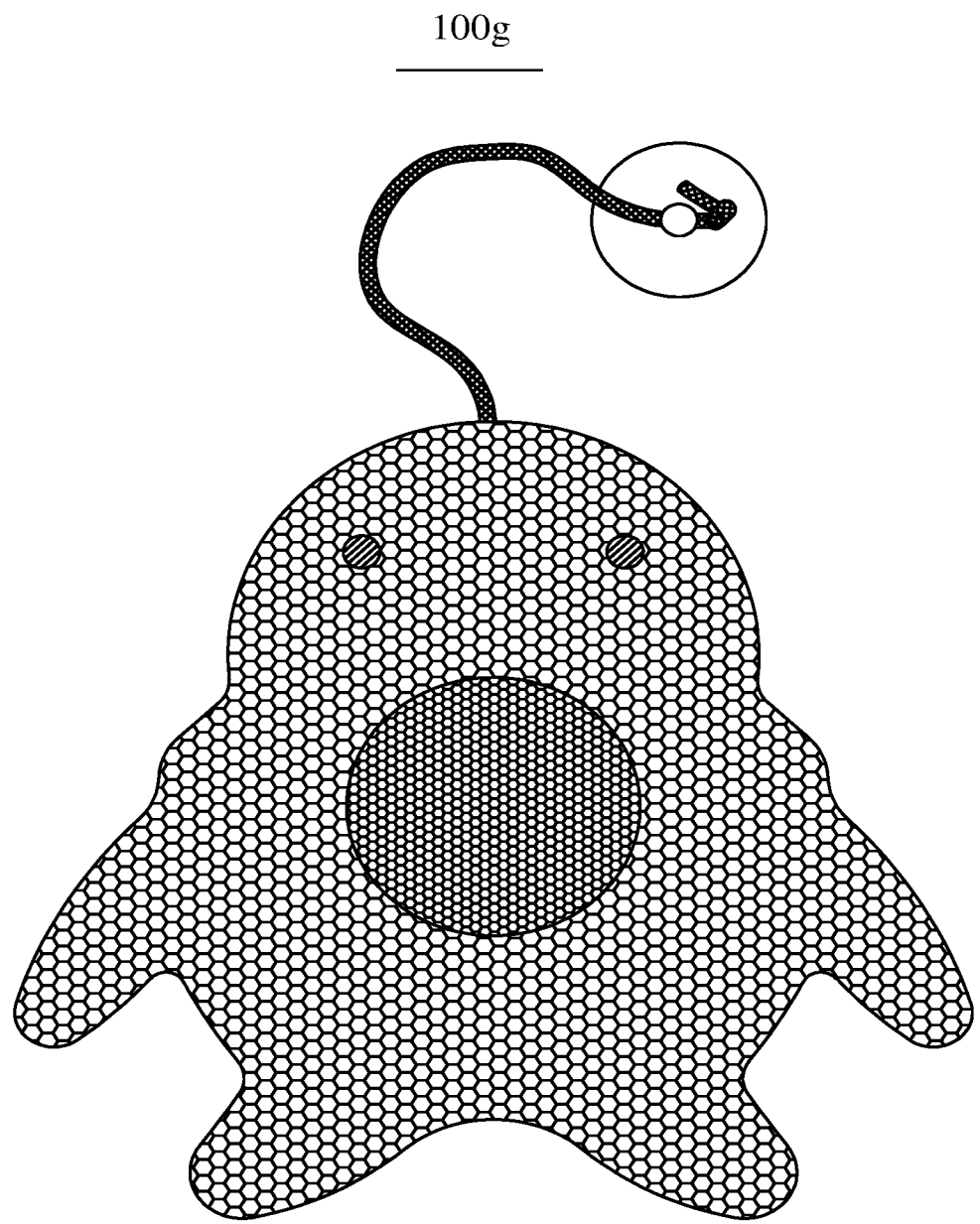
FIG. 13 is a structure diagram of a scum absorbing device according to a seventh embodiment of the present disclosure.

Referring to FIG. 13, the present disclosure provides a scum absorbing device 100g according to a seventh embodiment, the scum absorbing device 100g is similar to the scum absorbing device 100b in structure, the difference between the two at least includes: the scum absorbing device 100d is penguin shaped.

Figure 14:
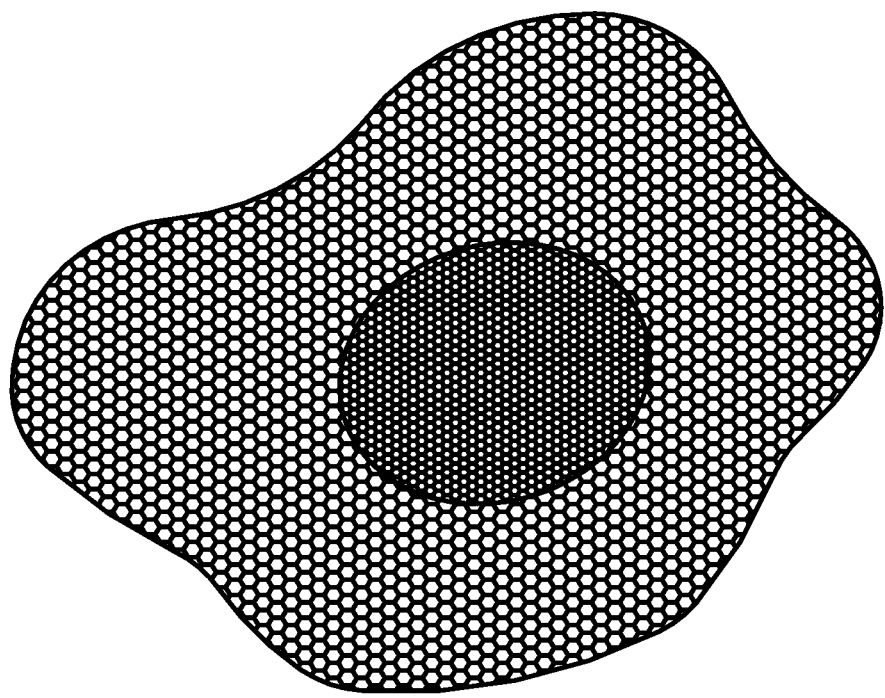
FIG. 14 is a structure diagram of a scum absorbing device according to an eighth embodiment of the present disclosure.

Referring to FIG. 14, the present disclosure provides a scum absorbing device 100h according to an eight embodiment, the scum absorbing device 100h is similar to the scum absorbing device 100b in structure, the difference between the two at least includes: the scum absorbing device 100h is fried egg shaped.

Figure 15:
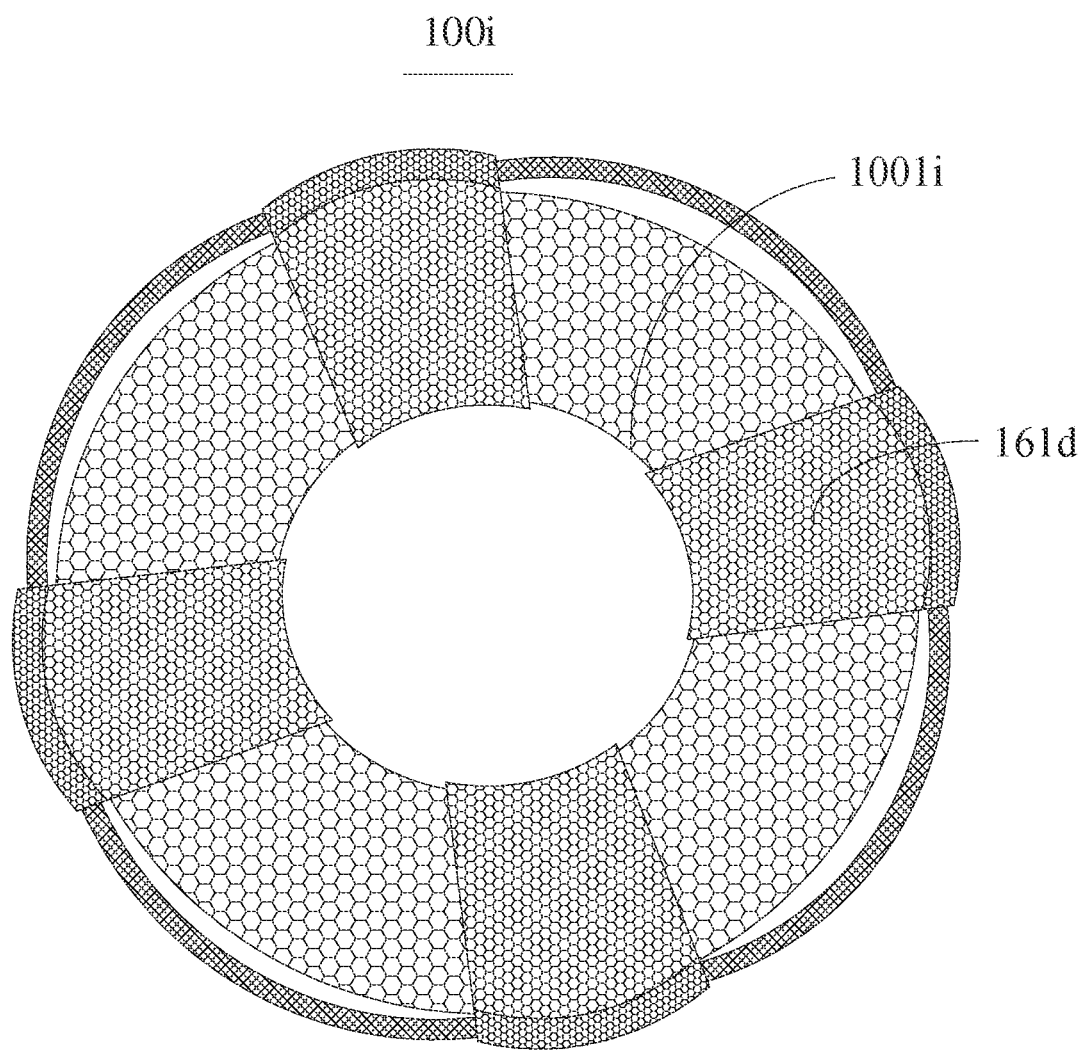
FIG. 15 is a structure diagram of a scum absorbing device according to a ninth embodiment of the present disclosure.

Referring to FIG. 15, the present disclosure provides a scum absorbing device 100i according to a ninth embodiment, the scum absorbing device 100i is similar to the scum absorbing device 100c in structure, the difference between the two at least includes: the scum absorbing device 100i is ring shaped and defines a through hole 1001i; and the protruding portions 161d protrudes from an edge of the through hole 1001i and an edge of the scum absorbing device 100i.

Figure 16:
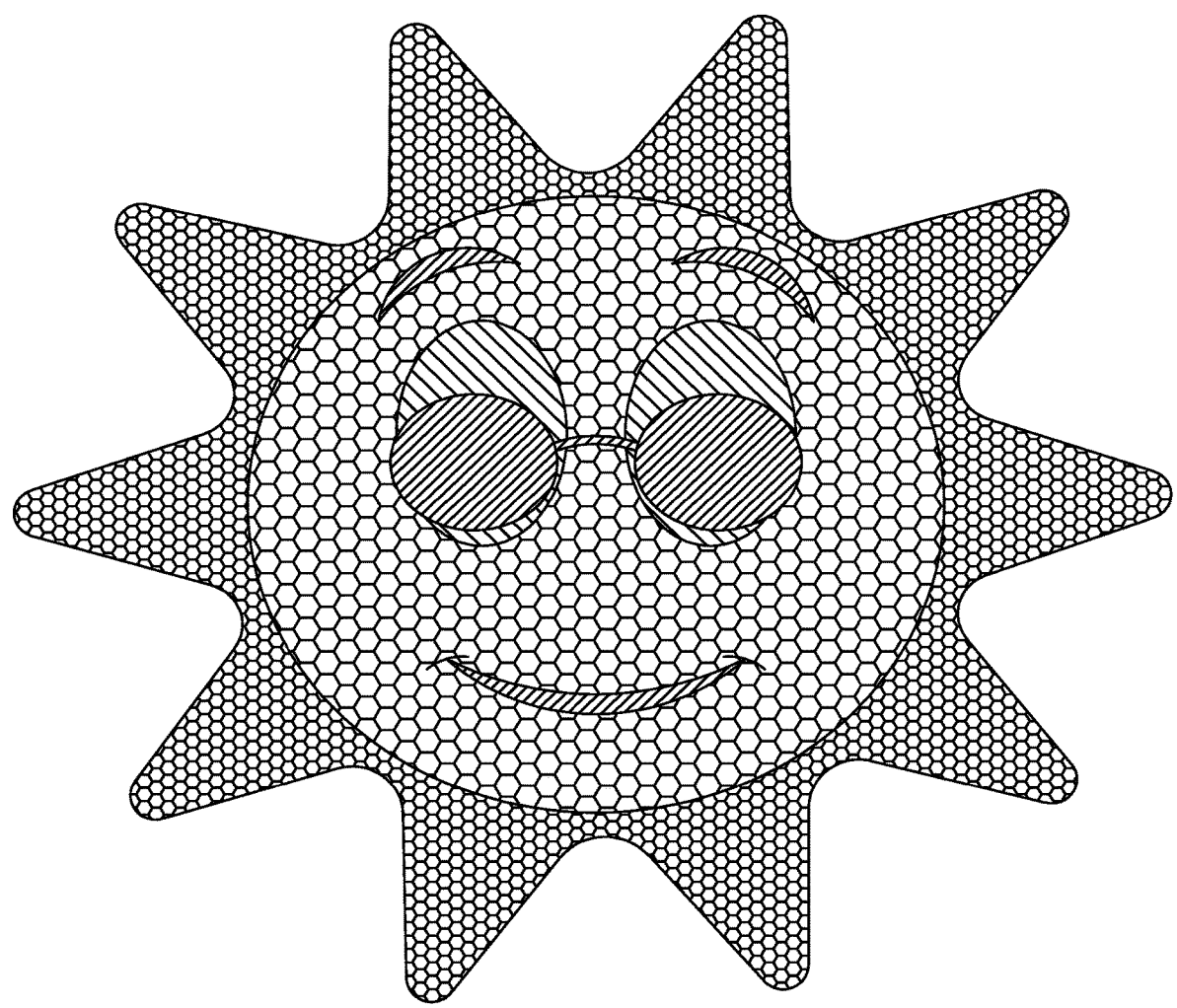
FIG. 16 is a structure diagram of a scum absorbing device according to a tenth embodiment of the present disclosure.

Referring to FIG. 16, the present disclosure provides a scum absorbing device 100j according to a tenth embodiment, the scum absorbing device 100j is similar to the scum absorbing device 100c in structure, the difference between the two at least includes: the front absorbing body 101j is printed with glasses, nose, eyes, eyebrows, and mouth.

Figure 17:
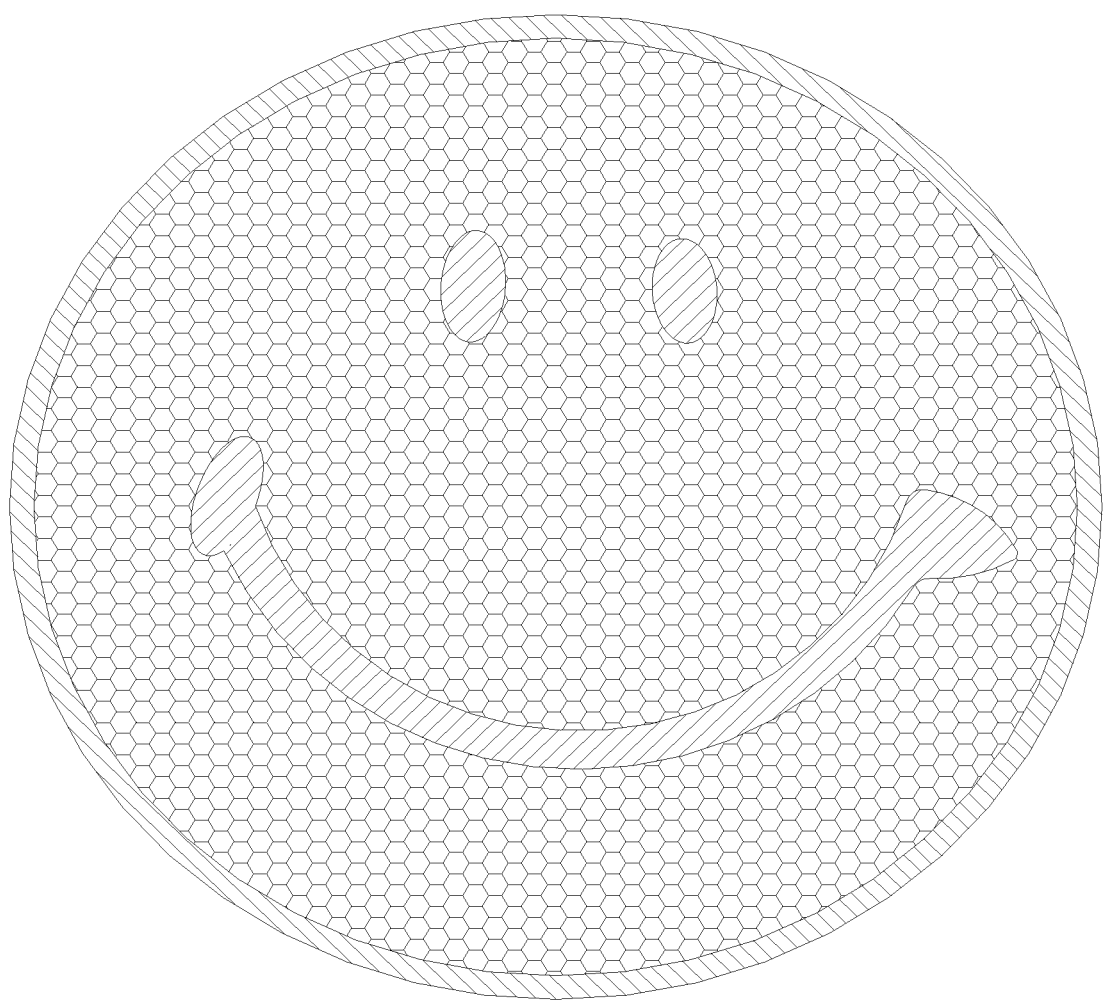
FIG. 17 is a structure diagram of a scum absorbing device according to an eleventh embodiment of the present disclosure.

Referring to FIG. 17, the present disclosure provides a scum absorbing device 100k according to an eleventh embodiment, the scum absorbing device 100k is similar to the scum absorbing device 100a in structure, the difference between the two at least includes: the scum absorbing device 100k is smiley face shaped.

Figure 18:
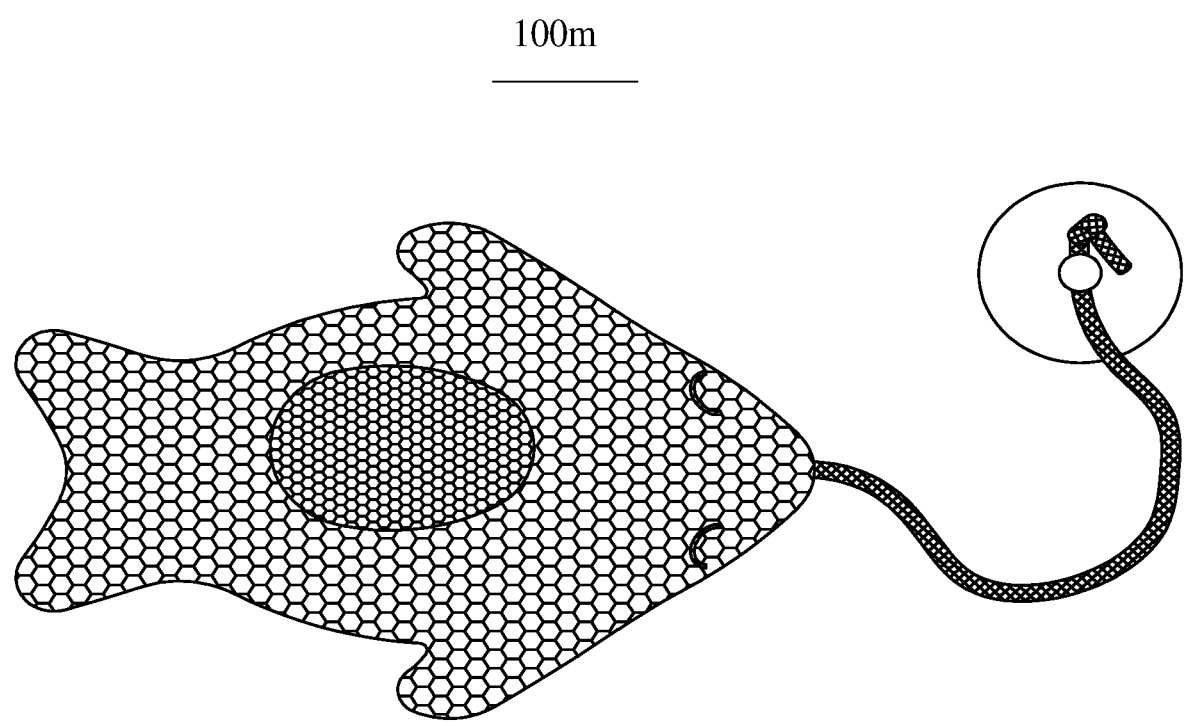
FIG. 18 is a structure diagram of a scum absorbing device according to a twelfth embodiment of the present disclosure.

Referring to FIG. 18, the present disclosure provides a scum absorbing device 100m according to a twelfth embodiment, the scum absorbing device 100m is similar to the scum absorbing device 100b in structure, the difference between the two at least includes: the scum absorbing device 100m is fish shaped.

Figure 19:
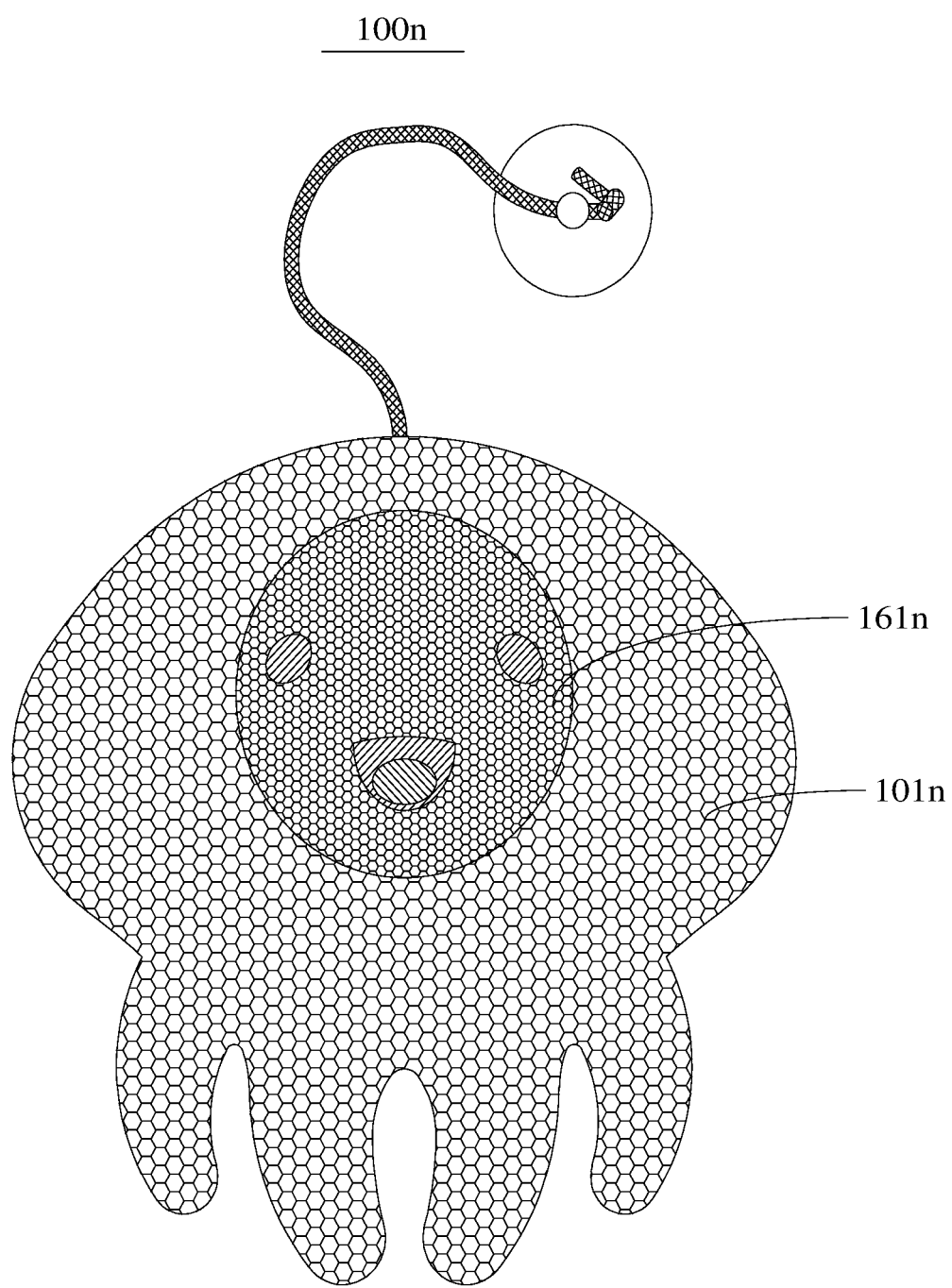
FIG. 19 is a structure diagram of a scum absorbing device according to a thirteenth embodiment of the present disclosure.
Figure 20:
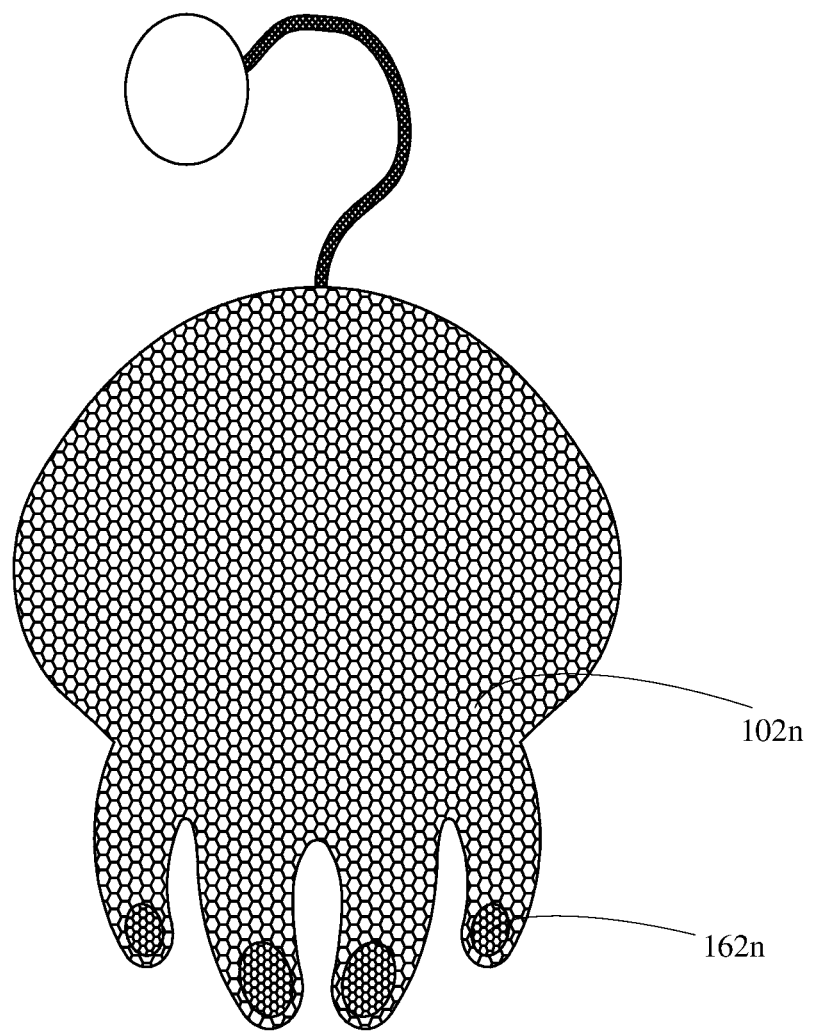
FIG. 20 is another structure diagram of the scum absorbing device of FIG. 19.

Referring to FIGS. 19-20, the present disclosure provides a scum absorbing device 100m according to a thirteenth embodiment, the scum absorbing device 100m is similar to the scum absorbing device 100b in structure, the difference between the two at least includes: the scum absorbing device 100m is octopus shaped; the first protruding portion 161n protrudes from the front absorbing body 101n, the second protruding portion 162n protrude from tentacles of the rear absorbing body 102n.

Figure 21:
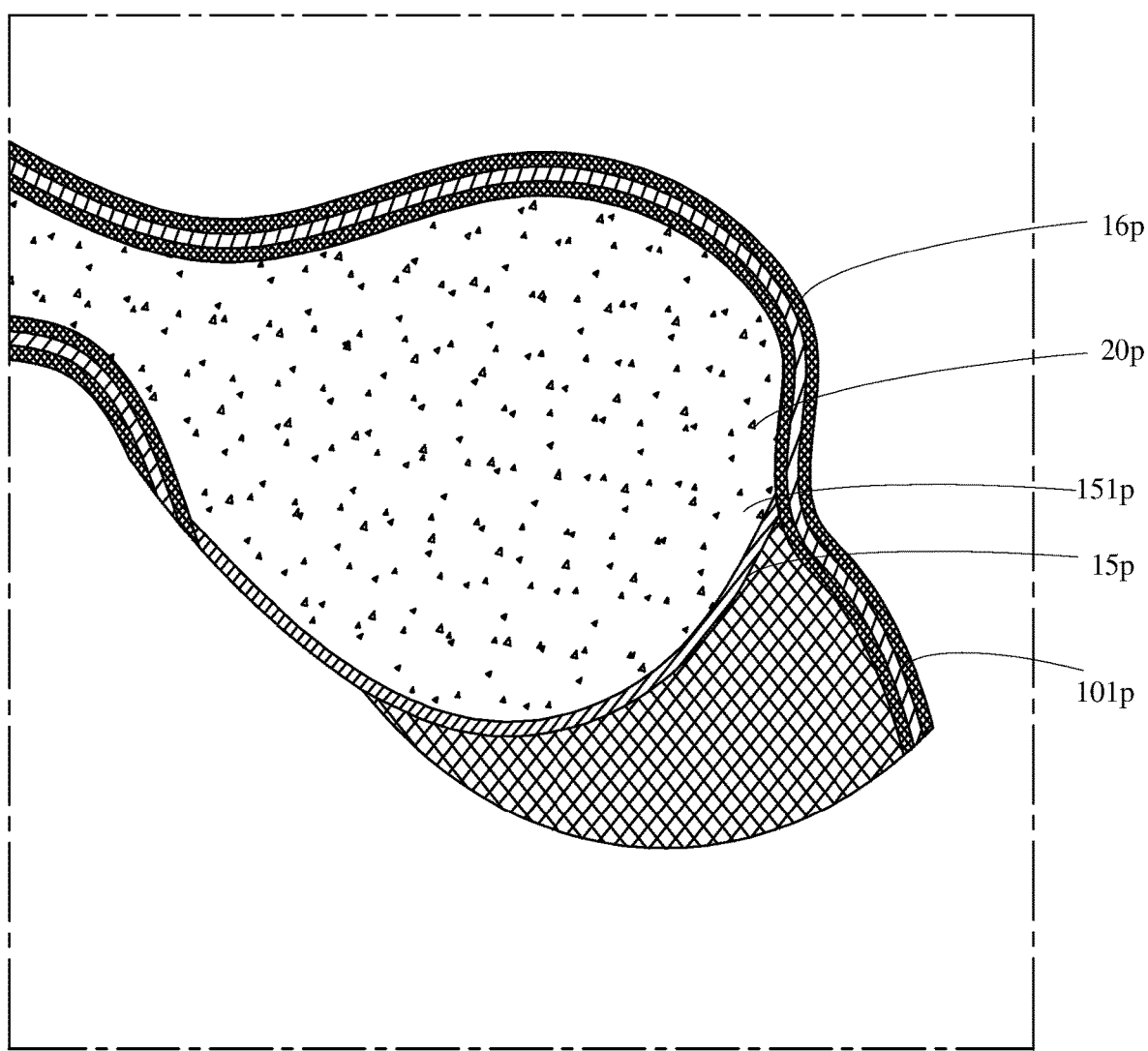
FIG. 21 is a structure diagram of a scum absorbing device according to a fourteenth embodiment of the present disclosure.

Referring to FIG. 21, the present disclosure provides a scum absorbing device 100p according to a fourteenth embodiment, the scum absorbing device 100p is similar to the scum absorbing device 100a in structure, the difference between the two at least includes: the scum absorbing device 100p includes the front absorbing body 101p and the receiving member 15p connected with the front absorbing body 101p; the protruding portion 16p protrudes from at least a portion of the front absorbing body 101p to define the receiving portion 151p, the middle absorbing member 20p is received in the receiving portion 151p.

Figure 22:
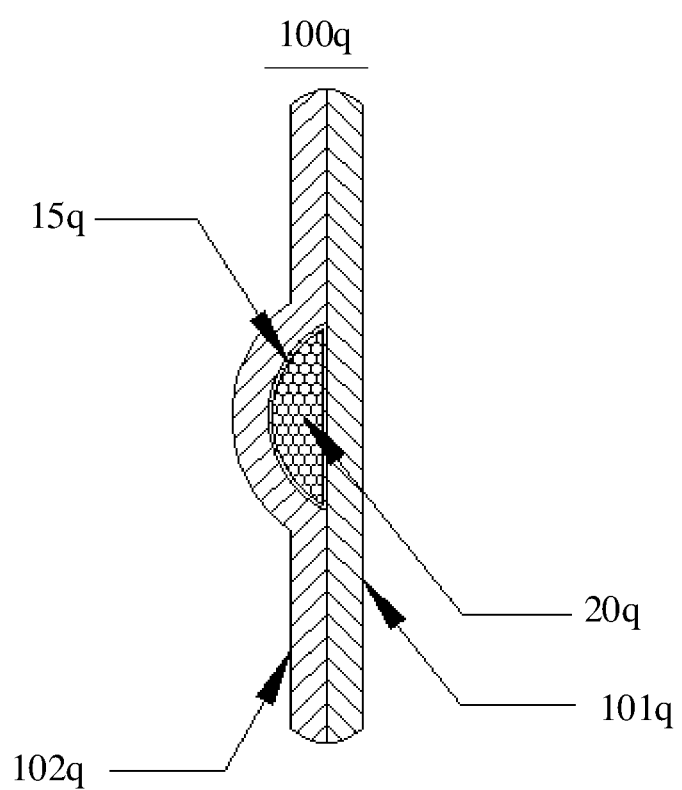
FIG. 22 is a cross sectional diagram of a scum absorbing device according to a fifteenth embodiment of the present disclosure.

Referring to FIG. 22, the present disclosure provides a scum absorbing device 100q according to a fifteenth embodiment, the scum absorbing device 100q is similar to the scum absorbing device 100a in structure, the difference between the two at least includes: the front absorbing body 101q is partially connected with the rear absorbing body 102q, the receiving member 15q and the middle absorbing member 20q are connected between the front absorbing body 101q and the rear absorbing body 102q. In detail, two ends of the receiving member 15q are connected with the front absorbing body 101q, and a body of the receiving member 15q is connected with the rear absorbing body 102q, to form the receiving portion 151q for receiving the middle absorbing member 20q.

The above description is merely some embodiments. It should be noted that for one with ordinary skills in the art, improvements can be made without departing from the concept of the present disclosure, but these improvements shall fall into the protection scope of the present disclosure.

What is claimed is:

1. A scum absorbing device, configured to float on a surface of water in a swimming pool or a bathtub for absorbing scums in the water, comprising a front absorbing body and a rear absorbing body, wherein, the front absorbing body comprises: a first front layer, comprising a first inner surface and a first outer surface, and defining a plurality of first front via holes through the first inner surface and the first outer surface; a second front layer comprising a second inner surface and a second outer surface and defining a plurality of second front via holes; and a third front layer, connected between the first front layer and the second front layer, the third front layer is configured to absorb or capture scums in the water; wherein the third front layer comprises a plurality of pile members, one end of each of the plurality of pile members is connected with the first inner surface without passing through the first front layer, and the other end of each of the plurality of pile members is connected with the second inner surface without passing through the second front layer; wherein the rear absorbing body comprises: a first rear layer, defining a plurality of first rear via holes; a second rear layer defining a plurality of second rear via holes; and a third rear layer, connected between the first rear layer and the second rear layer, the third rear layer is configured to absorb or capture scums in the water; wherein the rear absorbing body is connected with the front absorbing body, and the first front layer and the first rear layer are outermost layers; and the first front via holes are larger than the second front via holes and the first rear via holes are larger than the second rear via holes.

2. The scum absorbing device according to claim 1, wherein the third front layer is integratedly formed with the first front layer or the second front layer.

3. The scum absorbing device according to claim 1, wherein the first front via hole has a diameter of about 0.01-10 mm.

4. The scum absorbing device according to claim 1, wherein the pile members are spaced apart from each other to defines a plurality of gaps communicated with the first front via holes.

5. The scum absorbing device according to claim 4, wherein
the pile members are elastic;
and two adjacent pile members cross with each other.

6. The scum absorbing device according to claim 1, wherein the first rear layer, the second rear layer, and the third rear layer cooperatively form a sandwiched structure, and the third rear layer comprises a plurality of pile members, extending and connected between the first rear layer and the second rear layer, the pile members are spaced apart from each other to defines a plurality of gaps communicated with the first rear via holes.

7. The scum absorbing device according to claim 6, wherein the front absorbing body and the rear absorbing body cooperatively define a receiving space; and the scum absorbing device further comprises at least one middle absorbing member received in the receiving space, the at least one middle absorbing member is configured to absorb scums in the water.

8. The scum absorbing device according to claim 7, further comprising:
at least one receiving member, received in the receiving space, the at least one receiving member is connected with the front absorbing body or the rear absorbing body to define at least one receiving portion for receiving the at least one middle absorbing member.

9. The scum absorbing device according to claim 8, wherein the front absorbing body or the rear absorbing body comprises at least one protruding portion, the at least one protruding portion is connected with the at least one receiving member to cooperatively define the at least one receiving portion for receiving the at least one middle absorbing member.

10. The scum absorbing device according to claim 9, wherein
the at least one protruding portion comprises a first protruding portion protruded from the front absorbing body or the rear absorbing body, and a plurality of second protruding portions spaced apart from each other and protruded from the rear absorbing body or the rear absorbing body; and
the at least one middle absorbing member comprises a first middle absorbing member matched with the first protruding portion and a plurality of second middle absorbing members matched with the second protruding portions.

11. The scum absorbing device according to claim 10, wherein the first protruding portion is arranged at a middle portion of the front absorbing body or the rear absorbing body; and the second protruding portions are arranged around arranged along an edge of the front absorbing body or the rear absorbing body; and the second protruding portions are arranged around the first protruding portion; and the first protruding portion is larger than each of the second protruding portions in size.

12. The scum absorbing device according to claim 1, further comprising: at least one middle absorbing member, configured to absorb scum in water; and a receiving member, connected with the front absorbing body to define a receiving portion for receiving the at least one middle absorbing member.

13. A scum absorbing device, configured to float on a surface of water in a swimming pool or a bathtub for absorbing scums, comprising a front absorbing body and a rear absorbing body, wherein, the front absorbing body comprises: a first front layer comprising a first inner surface and a first outer surface and defining a plurality of first front via holes through the first inner surface and the first outer surface; a second front layer comprising a second inner surface and a second outer surface and defining a plurality of second front via holes; and a third front layer, extending between the first inner surface of the first front layer and the second inner surface of the second front layer; wherein the third front layer comprises a plurality of pile members, each of the plurality of pile members extends from the first inner surface to the second inner surface without passing through the first front layer and the second front layer, and two adjacent pile members cross with each other; and wherein the rear absorbing body comprises: a first rear layer, defining a plurality of first rear via holes; a second rear layer defining a plurality of second rear via holes; and a third rear layer, connected between the first rear layer and the second rear layer, the third rear layer is configured to absorb or capture scums in the water; wherein the rear absorbing body is connected with the front absorbing body, and the first front layer and the first rear layer are the outermost layers; and the first front via holes are larger than the second front via holes and the first rear via holes are larger than the second rear via holes.

14. The scum absorbing device according to claim 13, wherein the pile members are spaced apart from each other.

15. The scum absorbing device according to claim 14, wherein
the pile members are elastic.

16. The scum absorbing device according to claim 13, wherein the front absorbing body and the rear absorbing body cooperatively define a receiving space; and the scum absorbing device further comprises at least one middle absorbing member received in the receiving space, the middle absorbing member is configured to absorb scums in the water.

17. The scum absorbing device according to claim 16, further comprising:
at least one receiving member, received in the receiving space, the at least one receiving member is connected with the front absorbing body or the rear absorbing body to define at least one receiving portion for receiving the at least one middle absorbing member.

18. The scum absorbing device according to claim 17, wherein the front absorbing body or the rear absorbing body comprises at least one protruding portion, the at least one protruding portion is connected with the at least one receiving member to cooperatively define the at least one receiving portion for receiving the at least one middle absorbing member.

19. The scum absorbing device according to claim 18, wherein the at least one protruding portion comprises a first protruding portion protruded from the front absorbing body or the rear absorbing body, and a plurality of second protruding portions spaced apart from each other and protruded from the front absorbing body or the rear absorbing body; and the at least one middle absorbing member comprises a first middle absorbing member matched with the first protruding portion and a plurality of second middle absorbing members matched with the second protruding portions, wherein the first protruding portion is arranged at a middle portion of the front absorbing body or the rear absorbing body; and the second protruding portions are arranged around arranged along an edge of the front absorbing body or the rear absorbing body.

* * * * *